No. 773,077. PATENTED OCT. 25, 1904.
E. JENNINGS.
STOVE GRATE OR FIRE TRAY.
APPLICATION FILED JUNE 1, 1903. RENEWED MAR. 26, 1904.
NO MODEL.
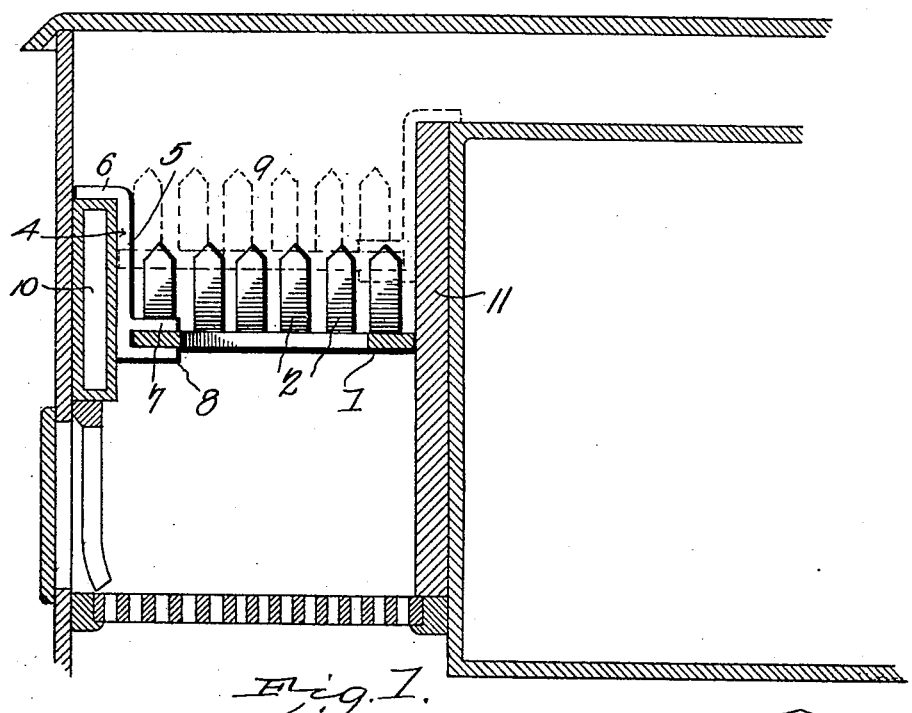
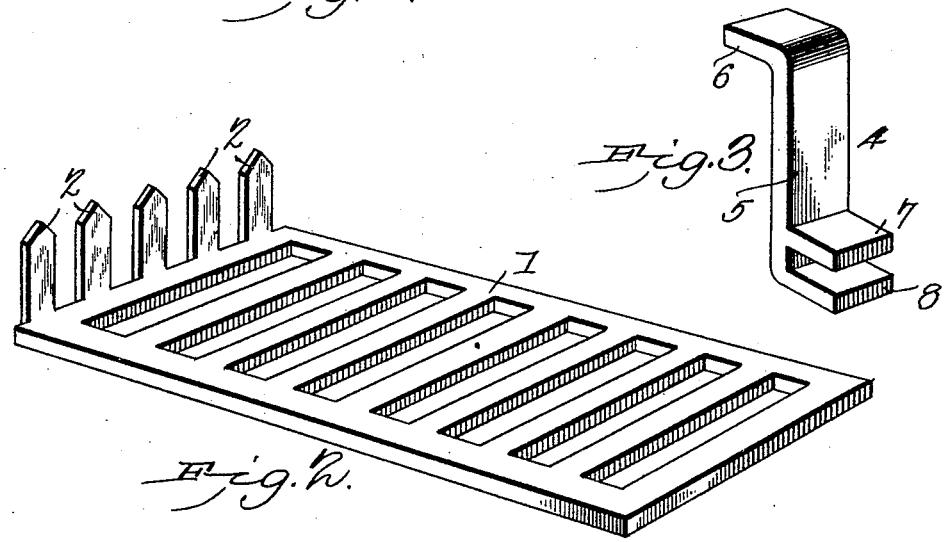
Witnesses
E. F. Stewart
Wm Ragger
E. Jennings, Inventor.
by C. A. Snow & Co
Attorneys No. 773,077.

Patented October 25, 1904.

UNITED STATES PATENT OFFICE.

ELMIRA JENNINGS, OF SALT LAKE CITY, UTAH.

STOVE GRATE OR FIRE-TRAY.

SPECIFICATION forming part of Letters Patent No. 773,077, dated October 25, 1904.

Application filed June 1, 1903. Renewed March 26, 1904. Serial No. 200,192. (No model.)

*To all whom it may concern:*

Be it known that I, ELMIRA JENNINGS, a citizen of the United States, residing at Salt Lake City, in the county of Salt Lake and State of Utah, have invented a new and useful Stove Grate or Fire-Tray, of which the following is a specification.

This invention relates to attachments for cooking-stoves, and it may be described as being an improvement upon the device for which Letters Patent of the United States No. 720,589 were granted to myself on the 17th day of February, 1903. In my said patent I provide a tray or grate adapted to be inserted and supported in the fire-box of a cook-stove of ordinary construction in order to form a fire-receptacle grate of reduced capacity capable of being conveniently used when only a small fire is desired, said grate or fire-basket being also capable of being reversed according to the direction in which it is desired to project the greatest amount of heat.

By my present improvement I provide a supporting device, which I term a "supporting-fork," which is adapted to be supported upon the upper edge of either the water-back or the lining of the stove and which is provided at its lower end with outwardly-extending fingers or prongs, between which a grate consisting of a flat slotted plate may be supported. This plate is provided at one end thereof with upstanding fingers, which when the stove-door is open will prevent the coals of fire from falling out upon the floor. These fingers are formed at one end of the plate only, and the latter is thus reversible, so as to serve equally well in connection with a fire-chamber having a right-hand or a left-hand door.

The detailed construction of my invention will be readily understood by reference to the accompanying drawings, in which—

Figure 1 is a sectional view representing the fire-box of a stove in which my invention has been placed in operative position, said device being shown in dotted lines in a different position. Fig. 2 is a perspective view illustrating my improved fire-grate. Fig. 3 is a perspective view of the holder or supporting-fork.

Corresponding parts in the several figures are indicated by similar numerals of reference.

1 designates the grate or fire-tray, which consists of a flat casting rectangular in shape and of suitable dimensions to fit the fire-box of the stove in connection with which it is to be used. It is obvious that this grate or fire-tray may be made in different sizes. The plate constituting this grate or fire-tray is provided at one end thereof with upstanding fingers or grate-bars 2, of which any desired number may be used. Said plate is also slotted either longitudinally or, as shown in the drawings, transversely, whereby upward draft is permitted and the ashes are permitted to sift through the said slots.

4 designates the holder or supporting-fork, which consists of a bar 5, provided at its upper end with a laterally-extending supporting arm or flange 6 and provided at its lower end with a pair of laterally-extending fingers or prongs 7 and 8, which may be of any desired length and which are spaced apart a distance practically equal to the thickness of the plate 1, which constitutes the grate or fire-tray.

The edge of the grate is in practice inserted between the fingers or prongs 7 and 8, where said grate will be held securely by its own weight. The holder is then placed in the fire-box 9 of an ordinary stove, with its upper edge resting either upon the fireback, which is indicated at 10, or upon the upper edge of the lining, which is designated 11. In the accompanying drawings the holder or supporting-fork has been shown in full lines as resting upon the upper edge of the water-back, and in dotted lines it has been shown as being supported upon the stove-lining. The latter is in this instance higher than the upper edge of the water-back, and it will thus be seen that by transferring the supporting device from the water-back to the lining the grate or fire-tray may be placed at a somewhat higher elevation. Ordinarily in cook-stoves the lining and the fireback are of different heights, although the lining is not always necessarily the higher; but wherever the difference in height exists it is obvious that I may take advantage of such difference to adjust the grate or fire-tray at a greater or less elevation.

In practice I do not necessarily limit myself to the use of a single supporting device, as two or more may be used, if desired. I also desire it to be understood that I do not limit myself to the precise construction and conformation of parts herein set forth, but reserve the right to such changes as may be resorted to within the scope of my invention and without departing from the spirit or sacrificing the utility of the same.

Having thus described my invention, I claim—

The combination with an apertured plate constituting an auxiliary grate or fire-tray provided with upstanding fingers at one end, of a holder comprising a vertical bar, a supporting-flange at the upper end of said bar, and a pair of holding-tongs at the lower end of said bar, said holding-tongs being adapted to secure the grate at either side thereof and to be suspended within the fire-pot of the stove from the top of the water-back on one side or from the top of the fire-pot lining on the other side.

In testimony that I claim the foregoing as my own I have hereto affixed my signature in the presence of two witnesses.

ELMIRA JENNINGS.

Witnesses:
E. W. WILSON,
ARTHUR BROWN.